Feb. 14, 1928.　　　　　F. HILLEBRAND　　　　　1,659,106
DYNAMO ELECTRIC MACHINE
Filed Aug. 22, 1927
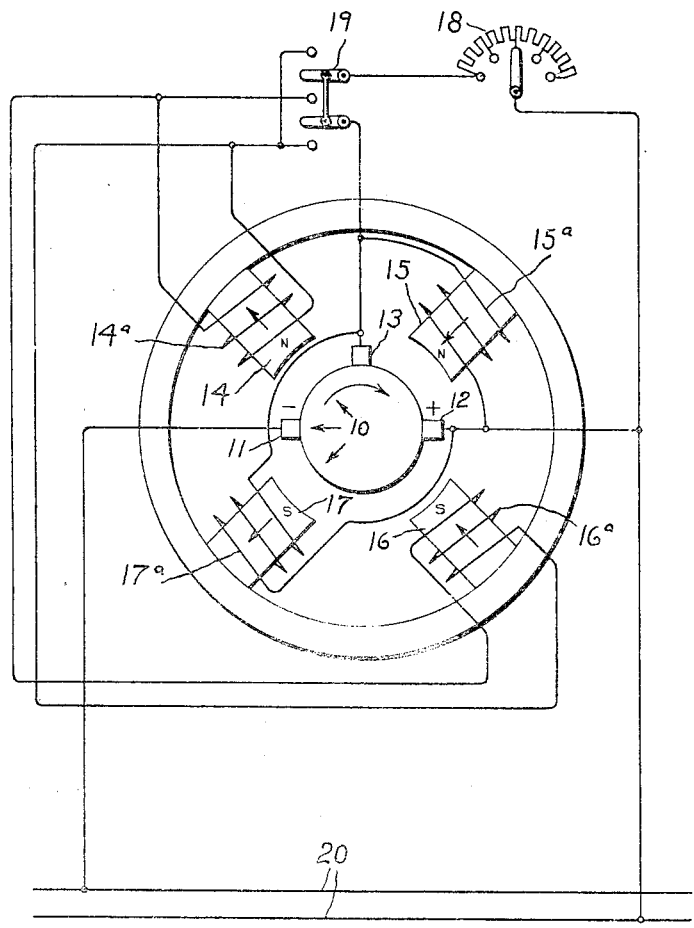
Inventor
Franz Hillebrand
by
His Attorney Patented Feb. 14, 1928.

1,659,106

UNITED STATES PATENT OFFICE.

FRANZ HILLEBRAND, OF NIEDERSCHONHAUSEN, BERLIN, GERMANY, ASSIGNOR TO GENERAL ELECTRIC COMPANY, A CORPORATION OF NEW YORK.

DYNAMO-ELECTRIC MACHINE.

Application filed August 22, 1927, Serial No. 214,507, and in Germany October 11, 1926.

My invention relates to dynamo-electric machines of the split-pole commutator type and has for its object the provision of a self-excited generator of this character in which the voltage may be adjusted over a range from substantially zero to the full voltage of the machine, and in which the terminal voltage for any given adjustment will remain substantially constant.

My invention will be more fully set forth in the following description referring to the accompanying drawing and the features of novelty which characterize my invention will be pointed out with particularity in the claims annexed to and forming a part of this specification.

The single figure of the drawing diagrammatically illustrates a split-pole generator embodying my invention.

My new generator, which is driven clockwise as indicated by the arrow in the drawing by any suitable means, is shown for convenience of illustration as comprising a two pole armature provided with a commutator 10, load brushes 11 and 12 arranged 180 electrical degrees apart, and an auxiliary brush 13. The field flux is produced by a field structure comprising poles, each of which is split into two parts, one pole comprises the parts 14 and 15 provided with exciting windings $14^a$ and $15^a$ normally of like polarity and the other pole comprises the parts 16 and 17 provided with exciting windings $16^a$ and $17^a$ also normally of like polarity. The load brushes 11 and 12, which are connected to the external load circuit 20, are arranged on the neutral axis between the poles and the auxiliary brush is arranged on an axis between the parts 14 and 15 of one of the poles.

In this construction, which is of the usual type of split-pole generator, as the load current increases the armature reaction diminishes the field flux produced by the leading parts 14 and 16 of each pole, and at the same time augments the field flux produced by the trailing parts 15 and 17, in a manner well understood in the art. Consequently the voltage induced in the group of armature conductors between the auxiliary brush 13 and the load brush 12 is increased by the effect of the armature reaction which increases the voltage between them.

In accordance with my invention the terminal voltage at which the generator is adjusted to operate is maintained constant or slightly increased as the load current increases by connecting the exciting windings $14^a$, $15^a$, $16^a$ and $17^a$ in a circuit between the brushes 12 and 13 so that the excitation of these windings is increased as the load current of the generator increases. I also provide a variable resistance 18 and pole changing switch 19 in the circuit between these brushes and the exciting windings $14^a$ and $16^a$ of the leading poles so that the voltage at which the generator is operated may be adjusted from substantially zero to the full voltage of the generator. Decreasing the excitation of the widings $14^a$ and $16^a$ of the leading parts 14 and 16 of the poles correspondingly decreases the total flux of the generator and its terminal voltage, but the variation possible in this way is limited by the fact that the flux produced by the trailing parts 15 and 17 of the poles is not changed. I obtain further decrease in the terminal voltage of the generator by reversing the polarity of the windings $14^a$ and $16^a$ of the leading parts of each pole which induces an electromotive force in the armature conductors opposing that induced therein by the flux of the trailing parts 15 and 17 of the poles. It is apparent that when the flux of reverse polarity produced by the leading parts of the poles is equal in density to that produced by the trailing parts of the poles, that the electromotive force induced by the leading and trailing parts of the poles on the same side of the armature between the load brushes 11 and 12 will balance, and that the terminal voltage of the generator will be substantially zero.

Although I have shown and described a generator having two split poles it is obvious that any suitable number of poles may be used in a generator constructed according to my invention. Moreover, a series field winding may also be provided to increase the compounding effect obtained by my construction which will require less ampere turns than prior construction.

What I claim as new and desire to secure by Letters Patent of the United States, is:

1. In a dynamo-electric machine, an armature provided with a commutator, load brushes and an auxiliary brush bearing on said commutator, a field magnet structure having poles each comprising two parts normally excited so as to be of the same polarity, means for exciting said poles connected between the auxiliary brush and the trailing load brush, and means for varying the excitation of the leading part of each pole to correspondingly vary the terminal voltage of the machine.

2. In a dynamo-electric machine, an armature provided with a commutator, load brushes and an auxiliary brush bearing on said commutator, a field magnet structure having poles each comprising two parts normally excited so as to be of the same polarity, means for exciting said poles connected between the auxiliary brush and the trailing load brush, means for varying the excitation of the leading part of each pole to correspondingly vary the terminal voltage of the machine, and means for varying the excitation and the polarity of the leading part of each pole to correspondingly vary the terminal voltage of the machine.

3. In a dynamo-electric machine, an armature provided with a commutator, load brushes and an auxiliary brush bearing on said commutator, a field magnet structure having poles each comprising two parts normally excited so as to be of the same polarity, means for exciting said poles connected between the auxiliary brush and the trailing load brush, and means for varying the excitation of the leading part of each pole to correspondingly vary the terminal voltage of the machine, the flux produced by the trailing part of each pole being substantially constant.

4. In a dynamo-electric machine, an armature provided with a commutator, load brushes and an auxiliary brush bearing on said commutator, a field magnet structure having poles each comprising two parts normally excited so as to be of the same polarity, means for exciting said poles connected between the auxiliary brush and the trailing load brush, means for varying the excitation of the leading part of each pole to correspondingly vary the terminal voltage of the machine, and means for varying the excitation and the polarity of the leading part of each pole to correspondingly vary the terminal voltage of the machine, the flux produced by the trailing part of each pole being substantially constant.

In witness whereof, I have hereunto set my hand this 30th day of July, 1927.

FRANZ HILLEBRAND.